(12) United States Patent
Cabrero et al.

(10) Patent No.: US 9,031,184 B2
(45) Date of Patent: May 12, 2015

(54) NUCLEAR FUEL CLADDING WITH HIGH HEAT CONDUCTIVITY AND METHOD FOR MAKING SAME

(75) Inventors: Julien Cabrero, Bordeaux (FR); René Pailler, Cestas (FR); Fabienne Audubert, Cadenet (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 670 days.

(21) Appl. No.: 13/119,469

(22) PCT Filed: Sep. 18, 2009

(86) PCT No.: PCT/FR2009/001105
§ 371 (c)(1),
(2), (4) Date: Mar. 17, 2011

(87) PCT Pub. No.: WO2010/031925
PCT Pub. Date: Mar. 25, 2010

(65) Prior Publication Data
US 2011/0170653 A1    Jul. 14, 2011

(30) Foreign Application Priority Data

Sep. 18, 2008   (FR) .................................... 08 05127

(51) Int. Cl.
| G21C 3/02 | (2006.01) |
|---|---|
| G21C 3/06 | (2006.01) |
| G21C 3/07 | (2006.01) |
| C04B 35/56 | (2006.01) |
| C04B 35/628 | (2006.01) |
| C04B 35/632 | (2006.01) |
| C04B 35/80 | (2006.01) |
| G21C 3/20 | (2006.01) |
| G21C 21/02 | (2006.01) |

(52) U.S. Cl.
CPC .............. *G21C 3/07* (2013.01); *C04B 35/5611* (2013.01); *C04B 35/5615* (2013.01); *C04B 35/5622* (2013.01); *C04B 35/62873* (2013.01); *C04B 35/62884* (2013.01); *C04B 35/62894* (2013.01); *C04B 35/62897* (2013.01); *C04B 35/6325* (2013.01); *C04B 35/806* (2013.01); *C04B 2235/3232* (2013.01); *C04B 2235/3244* (2013.01); *C04B 2235/3418* (2013.01); *C04B 2235/3813* (2013.01); *C04B 2235/3826* (2013.01); *C04B 2235/444* (2013.01); *C04B 2235/5244* (2013.01); *C04B 2235/5252* (2013.01); *C04B 2235/614* (2013.01); *C04B 2235/77* (2013.01); *G21C 3/20* (2013.01); *G21C 21/02* (2013.01); *Y02E 30/40* (2013.01); *C04B 35/6286* (2013.01)

(58) Field of Classification Search
USPC .......... 376/409, 416, 412, 414, 417; 423/440; 427/6; 428/34.5, 34.6, 325, 698
See application file for complete search history.

(56) References Cited

U.S. PATENT DOCUMENTS

| 5,122,509 | A * | 6/1992 | Beetz et al. ................... 505/161 |
|---|---|---|---|
| 5,194,330 | A * | 3/1993 | Vandenbulcke et al. ...... 428/336 |
| 5,254,397 | A * | 10/1993 | Kawai et al. ............... 428/293.4 |
| 6,733,907 | B2 * | 5/2004 | Morrison et al. ............. 428/699 |
| 7,666,463 | B1 * | 2/2010 | Youchison et al. ............... 427/5 |
| 8,149,984 | B2 * | 4/2012 | Ravenet ........................ 376/432 |
| 8,409,491 | B1 * | 4/2013 | Stackpoole et al. .......... 264/624 |
| 2003/0175453 | A1 * | 9/2003 | Steffier ....................... 428/34.5 |
| 2006/0039524 | A1 | 2/2006 | Feinroth |
| 2006/0227924 | A1 * | 10/2006 | Hallstadius et al. .......... 376/414 |
| 2007/0189952 | A1 | 8/2007 | Easler |
| 2009/0220040 | A1 * | 9/2009 | Takagi .......................... 376/416 |
| 2009/0274262 | A1 | 11/2009 | Ravenet |

OTHER PUBLICATIONS

Written Opinion for International Application No. PCT/FR2009/001105, established Apr. 5, 2011, with "reasoned statement" translated into English.
International Search Report from PCT (PCT/ISA/21), FR2009/001105, May 18, 2010.

* cited by examiner

*Primary Examiner* — Bret Hayes
(74) *Attorney, Agent, or Firm* — Browdy and Neimark, PLLC

(57) ABSTRACT

The invention relates to a nuclear fuel cladding totally or partially made of a composite material with a ceramic matrix containing silicon carbide (SiC) fibers as a matrix reinforcement and an interphase layer provided between the matrix and the fibers, the matrix including silicon carbide as well as at least one of the following additional carbides: titanium carbide (TiC), zirconium carbide (Zrc), and ternary titanium silicon carbide ($Ti_3SiC_2$). When irradiated and at temperatures of between 800° C. and 1200° C., said cladding can mechanically maintain the nuclear fuel within the cladding while enabling optimal thermal-energy transfer towards the coolant. The invention also relates to a method for making the nuclear fuel cladding.

20 Claims, 3 Drawing Sheets

NUCLEAR FUEL CLADDING WITH HIGH HEAT CONDUCTIVITY AND METHOD FOR MAKING SAME

FIELD OF THE INVENTION

This invention generally pertains to the field of nuclear fuel and, in particular, it relates to a nuclear fuel cladding for helium-cooled "high temperature" nuclear reactors as well as a process for manufacturing the same.

BACKGROUND OF THE INVENTION

Among the nuclear reactors of the future, the Fast Neutron Reactor (FNR), which uses helium as the coolant gas (the so-called "He-GFR" reactor), may be mentioned. This reactor is a so-called "high-temperature" reactor because during operation the temperature of its core generally lies in the range between 800° C. and 1200° C.

As described in patent application EP 1 913 600, a nuclear fuel cladding employed in such a reactor may be provided as a plate, a cylinder, a sphere or a network of cavities.

When subjected to the above-mentioned temperature conditions, this cladding requires the use of high-melting point refractory materials (in order to ensure sufficient thermomechanical stability to maintain the fuel within the cladding) and should have a high thermal conductivity under irradiation (in order to optimally transfer the generated thermal energy towards the coolant gas during operation of the nuclear reactor).

Ceramics, although they meet these criteria, are generally too brittle to withstand the operating conditions of a nuclear fuel cladding.

Indeed, fission reactions within the nuclear fuel generate solid and gaseous fission products which cause cladding swelling. When subjected to such loads, the ceramics that form the cladding may break-up and cause a loss of fuel confinement.

In order to avoid such a loss, it would therefore be beneficial to use a ceramic matrix composite (CMC) material of the $SiC_f$/SiC type, in order to achieve improved mechanical properties. Such a material is generally made of a two-dimensional or three-dimensional arrangement of silicon carbide fibers (referred to as $SiC_f$), which contributes to the reinforcement of the SiC ceramic matrix in which it is incorporated.

However, for a given temperature, the thermal conductivity of CMCs of the $SiC_f$/SiC type may strongly decrease after it has been subjected to irradiation.

During the operation of a "He-GFR" nuclear reactor subjected to high temperatures, such CMCs therefore prove to be inappropriate for the removal of thermal energy from the nuclear fuel cladding towards the coolant gas.

SUMMARY OF THE INVENTION

It is accordingly one of the objects of this invention to provide a nuclear fuel cladding totally or partially made of a composite material which, when irradiated and at temperatures of between 800° C. and 1200° C., is capable of mechanically maintaining the fuel within the cladding while enabling optimal transfer of the thermal energy generated towards the coolant gas.

The subject matter of the invention thus relates to a nuclear fuel cladding, totally or partially made of a ceramic matrix composite material comprising silicon carbide SiC fibers as a reinforcement for the matrix and an interphase layer provided between the matrix and the fibers, the matrix comprising at least one carbide selected from titanium carbide TiC, zirconium carbide ZrC, or ternary titanium silicon carbide $Ti_3SiC_2$.

As shown below, when irradiated and at temperatures between 800° C. and 1200° C. (preferably, between 800° C. and 1000° C., or even equal to 800° C.), the nuclear fuel cladding according to the invention has a thermal conductivity which allows the transfer of heat towards the coolant to be improved, whilst at the same time preserving the thermomechanical (high melting point) and mechanical (reduced brittleness) properties, which are inherent to CMCs and which enable optimum confinement of the fuel contained within the cladding.

According to a preferred embodiment, the matrix of the ceramic matrix composite material further comprises silicon carbide SiC. Thus, for example, silicon carbide SiC, represents less than 50% (typically, from 1% to 50%) by volume of the matrix, preferably less than 25% (typically from 1% to 25%), and still more preferably, less than 10% (typically, from 1% to 10%). The addition of these varying quantities of SiC enables the matrix properties (such as the thermal conductivity) to be optimally adapted to the prevailing conditions. The incorporation of SiC within the matrix also allows its thermomechanical compatibility with SiC fibers to be improved: for example, the matching between the thermal expansion coefficients allows the effects of a differential expansion between the matrix and the fibers, which could lead to cracking of the nuclear fuel cladding, to be reduced.

In a preferred embodiment, the silicon carbide SiC in the matrix represents between 5% and 15% by volume of the matrix (in particular when the matrix contains TiC). Unexpectedly, as illustrated below, such a matrix composition makes it possible to achieve optimal thermal conductivity.

Optionally, the matrix has a columnar microstructure.

As for the fibers, they may be totally or partially ordered. Thus, they generally originate from a fibrous pre-form, which is most often made of fibers, which instead of being arranged randomly, are ordered.

Thus, in particular, the fibers may have a form such as that of a two-dimensional weave (braids, for instance), a pseudo two-dimensional weave (such as a braided fabric which is sewn afterwards), a three-dimensional weave, a knit fabric, or felts.

Preferably, the fibers are in the form of braids or felts, whenever the nuclear fuel cladding has the form of a tube or a plate, respectively.

Concerning their composition, the fibers are made of SiC, such that they are particularly well suited to the context of the invention because SiC has an excellent neutron and thermal stability.

Furthermore, an interphase layer is provided between the fibers and the matrix.

This layer may be totally or partially made of a compound comprising several superimposed layers, such a compound preferably being pyrolytic carbon.

The superimposed nature of such layers may be:
  caused by the inherent structure of the compound (namely because this compound naturally possesses this type of structure, as is the case for pyrolytic carbon which is necessarily constituted by graphite planes: such a structure is then said to be lamellar), or
  obtained by means of the process for manufacturing the compound (which process may for example be a pulsed CVI process as described below: such a structure is then said to be of the multilayer type).

The interphase layer may have a mean thickness in the range between 10 nm and 500 nm, preferably between 10 nm and 50 nm, and still more preferably between 10 nm and 30 nm, whereby a reduction in this thickness most often results in an improvement in the mechanical properties.

The porosity of the composite material, which forms all or part of the nuclear fuel cladding according to the invention, is preferably 10% (or even 5%) by volume or less in order to promote high thermal conductivity.

A further object of the invention is to provide a process for manufacturing a nuclear fuel cladding according to the invention. This process comprises the preparation of the composite material according to the following consecutive steps:

a) making a fiber pre-form from the fibers, b) depositing said interphase layer by chemical vapor infiltration onto said pre-form, c) depositing said matrix by chemical vapor infiltration onto said pre-form coated with said interphase layer.

The fiber pre-form generally has a geometry which is close to that of the nuclear fuel cladding to be manufactured. At the end of the manufacturing process of the invention, this cladding therefore is most often in its final form or requires at most a few regrinding operations.

Preferably, the chemical vapor infiltration of step c) is performed using a mixture of precursors comprising i) at least one compound selected from a titanium-, zirconium- or silicon compound, ii) a hydrocarbon and iii) hydrogen.

More preferably, these precursors are then such that:
the titanium compound is at least one compound selected from $TiCl_4$, $TiBr_4$ or $Ti[CH_2C(CH_3)_3]_4$,
the zirconium compound is at least one compound selected from $ZrCl_4$, $ZrBr_4$ or $Zr[CH_2C(CH_3)_3]_4$,
the silicon compound is at least one compound selected from $SiCl_4$, $SiH_2Cl_4$ or $CH_3SiCl_3$,
the hydrocarbon is at least one compound selected from $CCl_4H_2$, $CH_4$, $C_4H_{10}$ or $C_3H_8$.

Preferably, at least one of the chemical vapor infiltrations (namely, the infiltration performed to make the interphase layer according to step b) or that performed to deposit the matrix according to step c)) is of the pulsed type.

Other objects, features and advantages of the invention will become more apparent from the following description, which is given by way of non-limiting example.

DESCRIPTION OF PARTICULAR EMBODIMENTS OF THE INVENTION

Figure 1:
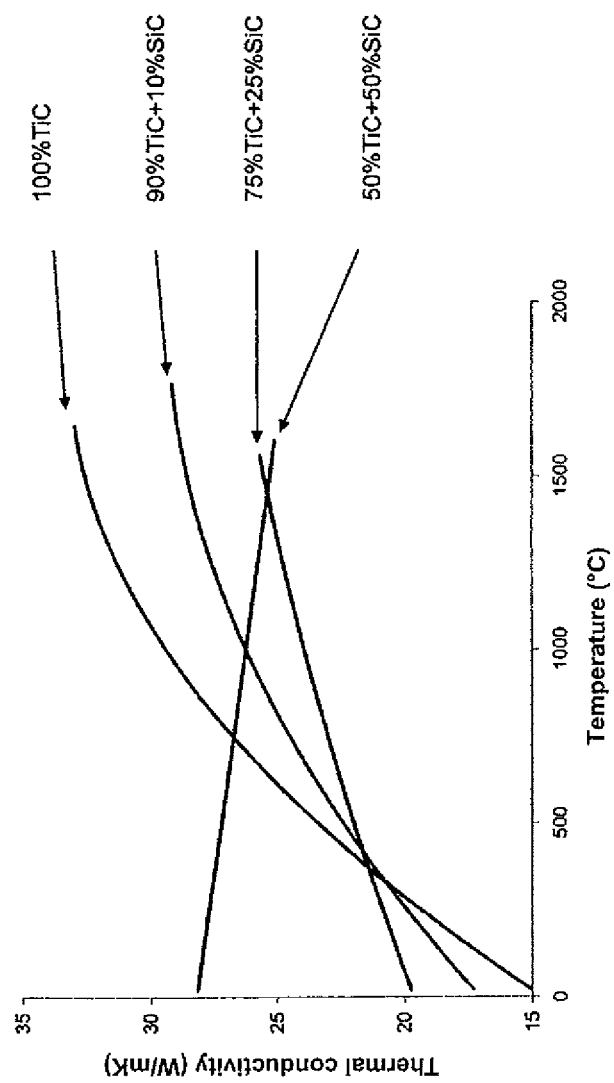
FIG. 1 shows the change, as a function of temperature, of the thermal conductivity of TiC-based ceramic materials, for varying SiC proportions.

The following examples illustrate the part of the manufacturing process of the invention in which the ceramic matrix composite (CMC) material, intended to enter into the composition of the nuclear fuel cladding, is prepared.

As discussed above, the use of a fiber pre-form having a shape and dimensions which are close or identical to those of the nuclear fuel cladding enables, at the end of the manufacturing process of the invention, such a cladding to be obtained in the form of a blank or even in its final form.

These example embodiments are followed by characterizing, before and after irradiation, the thermal properties of ceramic materials (without fibers and the interphase layer), which are representative of the prepared CMCs.

1—Manufacture of Ceramic Matrix Composite (CMC) Materials to Enter into the Composition of the Nuclear Fuel Cladding of the Invention.

The following manufacturing operations are performed using a process known to those skilled in the art, namely the chemical vapor infiltration process, known as CVI.

Using CVI, carbide may be formed from precursors and then deposited onto a fiber pre-form. Such precursors are generally available in gaseous form.

A particular type of CVI is pulsed-CVI, such as described, for example, in documents EP 0 385 869 or "T. M. Besmann, Ceram. Trans., Vol 58, pages 1-12, 1995".

In pulsed CVI, the precursors are transported by a pulse sequence within the reactor vessel (for example an oven). For each pulse, the pressure of the precursors within the oven changes over time according to the following three phases:

phase 1: increasing the pressure up to the working pressure (generally, a few kPa), in order to introduce the precursors;

phase 2: maintaining the working pressure (a stage during which the carbide is deposited);

phase 3: decreasing the pressure in order to discharge the excess precursors.

1.1—Manufacturing a CMC of the $SiC_f$/TiC Type

Using the CVI process, a fiber pre-form made of ordered fibers of silicon carbide SiC is coated with an interphase layer having a mean thickness of a few tens to a few hundreds of nanometers, composed of a lamellar compound, such as for example pyrolytic carbon (PyC).

The fiber pre-form is then placed in an oven at 1050° C. with heated walls and subjected to a primary vacuum.

Thereafter, using pulsed CVI, the CMC matrix is made by depositing, under a working pressure of 5 kPa, titanium carbide TiC through a vapor phase reaction starting with the gaseous precursors $TiCl_4$, $CH_4$ and $H_2$ initially contained in a mixture vessel under a pressure of 40 kPa.

To obtain as homogeneous a carbide deposit as possible, in terms of composition and microstructure, it is preferred to limit the deposition rate by working at a low temperature (typically in the range between 900° C. and 1200° C.) and under a low working pressure (typically in the range between 1 kPa and 10 kPa).

It should be noted that parameters other than the temperature and pressure may also influence the carbide deposit's homogeneity. In particular, these are the nature of the hydrocarbon, the proportion of carbon and the dilution factor.

Thus, for example, for a TiC deposition:
the proportion of carbon $m^{C/Ti}$ which corresponds to the ratio of the number of carbon atoms to the number of titanium atoms within the gaseous mixture of precursors, although it varies as a function of the hydrocarbon used, must generally be in the range between 1 and 18;
the dilution factor $\alpha$, which corresponds to the ratio of the total precursor concentration to the $TiCl_4$ concentration expressed in moles/liter (or $\alpha=([TiCl_4]+[CH_4]+[H_2])/[TiCl_4]$), must generally be in the range between 15 and 100.

The flow rate of the vector gases, $CH_4$, and especially $H_2$, and the control of the boiling temperature of $TiCl_4$ allow the $TiCl_4$ flow rate, and therefore the dilution factor $\alpha$ and carbon proportion $m^{C/Ti}$, to be controlled.

The pressure within the oven also depends on this flow-rate as well as on the opening time of the shut-off valve.

In the present case, the deposition parameters are as follows:
- average flow-rate of the carrier gases=30 liters/hour
- shut-off valve opening time (phase 1)=0.2 to 0.3 s
- residence time (phase 2)=4 to 5 s
- pumping time (phase 3)=1 s
- deposited thickness per pulse=1.5 nm
- α=50
- $m^{C/Ti}=9$
- deposition rate=approximately 1 μm/h.

A CMC of the $SiC_f/TiC$ type has thus been obtained, in which the matrix is made of stoechiometric TiC and has a columnar microstructure and a mean thickness of 40 μm.

1.2—Manufacturing a CMC of the $SiC_f/ZrC$ Type

Operating conditions similar to those described in the above example may be employed for preparing a CMC in which the matrix is composed of zirconium carbide ZrC. The only specific parameters are then as follows:

$ZrCl_4$, $C_3H_6$, $H_2$ gas and Ar in equivalent amounts/1600° C./$m^{C/Zr}$=0.5 (deposition rate of less than 14 μm/h); or $ZrBr_4$, $CH_4$, $H_2$, Ar/1000° C. to 1500° C./1 to 10 kPa.

1.3—Manufacture of a CMC of the $SiC_f/TiC$—SiC Type.

CMCs are now prepared in which the matrix has a mixed composition, such that it is composed of both titanium carbide TiC and silicon carbide SiC.

Pulsed CVI is particularly well suited to the manufacturing of mixed matrices because of the possibility to easily change the proportion of TiC to SiC by changing, for example, the number of pulses relating to the precursors of each of these carbides. This feature has been used to prepare three mixed $SiC_f/TiC$—SiC CMCs in which the matrix had the following TiC/SiC compositions in volume percentage: 90/10, 75/25, 50/50.

Several pulsed CVI deposition modes may be considered.

In a first embodiment, the number of pulses in each of the TiC and SiC deposition sequences is reduced such that the deposited layer is discontinuous.

The TiC deposition conditions are those mentioned in the previous example.

For SiC deposition, the conditions are also similar to those of TiC deposition, except for the following parameters:
- gas precursors: $H_2$ and MTS (methyltrichlorosilane of formula $CH_3SiCl_3$)
- temperature from 900° C. to 1050° C.
- working pressure from 1.5 kPa to 5 kPa
- $\alpha_{SiC}(P_{H2}/P_{MTS})$ from ¼ to 5 (from ¼ to ½, residual carbon is seen to be formed, and beyond 3, there is no more residual carbon. However, the deposition rate increases when $\alpha_{SiC}$ increases).

It should be noted that the deposition rate of the SiC layer is proportional to the temperature and pressure values shown.

In the present case, the following parameters effectively used for depositing SiC are as follows:
- temperature=1050° C.
- working pressure=4 kPa
- $\alpha_{SiC}(P_{H2}/P_{MTS})$=0.5
- mean thickness deposited per pulse=3 nm
- deposition rate=approximately 0.3 to 1 μm/h.

The pulse sequence structure is as follows: 2 pulses for TiC deposition, followed by one pulse for SiC deposition.

The obtained mixed matrix is made of stoechiometric SiC and TiC and has a mean thickness of 40 μm.

In a second embodiment, nano-sequenced depositions are made, namely depositions for which layers of different characteristics, having a mean thickness of 10 to 100 nm, are deposited consecutively. For that purpose, the precursor pulses specifically intended for TiC and SiC are produced consecutively (for instance, 40 pulses for SiC and 80 pulses for TiC, or 20 pulses for SiC and 40 pulses for TiC).

In a third embodiment, the SiC and TiC precursors are introduced together. Generally, the precursors and operating conditions are then selected from the following:

$TiCl_4$, $SiCl_4$, $CCl_4H_2$/950° C. to 1150° C./100 kPa
$TiCl_4$, $SiCl_4$, $C_3H_8$, $H_2$/950° C. to 1150° C./4–40 kPa
$TiCl_4$, $SiCl_4$, $CH_4$, $H_2$/950° C. to 1150° C./7 kPa
$TiCl_4$, $SiH_2Cl_4$, $C_4H_{10}$, $H_2$/950° C. to 1150° C./100 kPa
$TiCl_4$, $CH_3SiCl_3$, $H_2$/950° C. to 1150° C./1 kPa to 100 kPa
$TiCl_4$, $SiCl_4$, $C_3H_8$, $H_2$/950° C. to 1150° C./100 kPa

2—Thermal Properties of Ceramic Matrix Composite (CMC) Materials Comprising TiC.

Ceramic materials (without fibers and an interphase layer), with the same composition as the matrix of the four TiC-based CMCs made previously, are manufactured by sintering under pressure.

The four ceramic materials have the following TiC/SiC compositions in volume percentage: 100/0, 90/10, 75/25, 50/50.

These ceramic materials allow the relative thermal conductivity of the four previously made TiC-based CMCs to be determined because, even though the absolute value of their thermal conductivity differs from that of the corresponding CMCs, their relative value is comparable. In other terms, the behavior of the thermal conductivity of these ceramic materials with respect to one another is similar and is indicative of the behavior of the four previously prepared CMCs.

In practice, the thermal diffusivity of ceramic materials is measured at different temperatures.

Given the density and the mass heat capacity (noted Cp) of these ceramic materials, the thermal conductivity is then computed according to the formula k=α·ρ·Cp, in which:
- k is the thermal conductivity ($W·m^{-1}·K^{-1}$)
- α is the thermal diffusivity ($m^2·s^{-1}$)
- ρ is the density ($kg·m^{-3}$)
- Cp is the mass heat capacity ($J·kg^{-1}·K^{-1}$).

The Cp(T) formulas used for TiC and SiC are as follows:

$$C_p(SiC) = 925.65 + 0.3772T - 7.9259 \times 10^{-5}T^2 - \frac{3.1946 \times 10^7}{T^2}$$

(with T in K)

$$C_p(TiC) = 0.7415 + 0.00114T - 1.57655 \times 10^{-6}T^2 + 1.14714 \times 10^{-10}T^3 + 7.05467 \times 10^{-13}T^4$$

(with T in K).

When the ceramic material has a mixed composition (for example 75% TiC+25% SiC), its mass heat capacity is the weighted mean of the mass heat capacity of each of the carbides.

After computation, the change in thermal conductivity (trend curves) as a function of temperature is obtained, as shown in FIG. 1.

It may be concluded from FIG. 1 that the addition of an increasing amount of titanium carbide TiC into the matrix of a non-irradiated CMC of the $SiC_f/TiC$—SiC type allows the thermal conductivity of such a CMC to be increased despite the temperature raise, in particular for temperatures in the range between 800° C. and 1200° C. and for TiC contents greater than 50%.

The following thermal conductivity measurements have confirmed such a behavior of ceramic materials after irradiation.

These measurements were performed according to the same procedures on five irradiated ceramic materials, namely the four previous ceramic materials and one ceramic material made of 100% SiC (that is, ceramic materials having the following volume TiC/SiC compositions: 100/0, 90/10, 75/25, 50/50, 0/100).

The irradiation consisted in simulating a neutron flux by implanting Kr ions having an energy of 74 MeV so as to reach an irradiation dose of 1 dpa (displacement per atom), in order to create two damage areas, one for nuclear interactions (which simulates neutron damage) and one for electron interactions. The thermal conductivity was measured at 800° C. in the nuclear interaction area.

Figure 2:
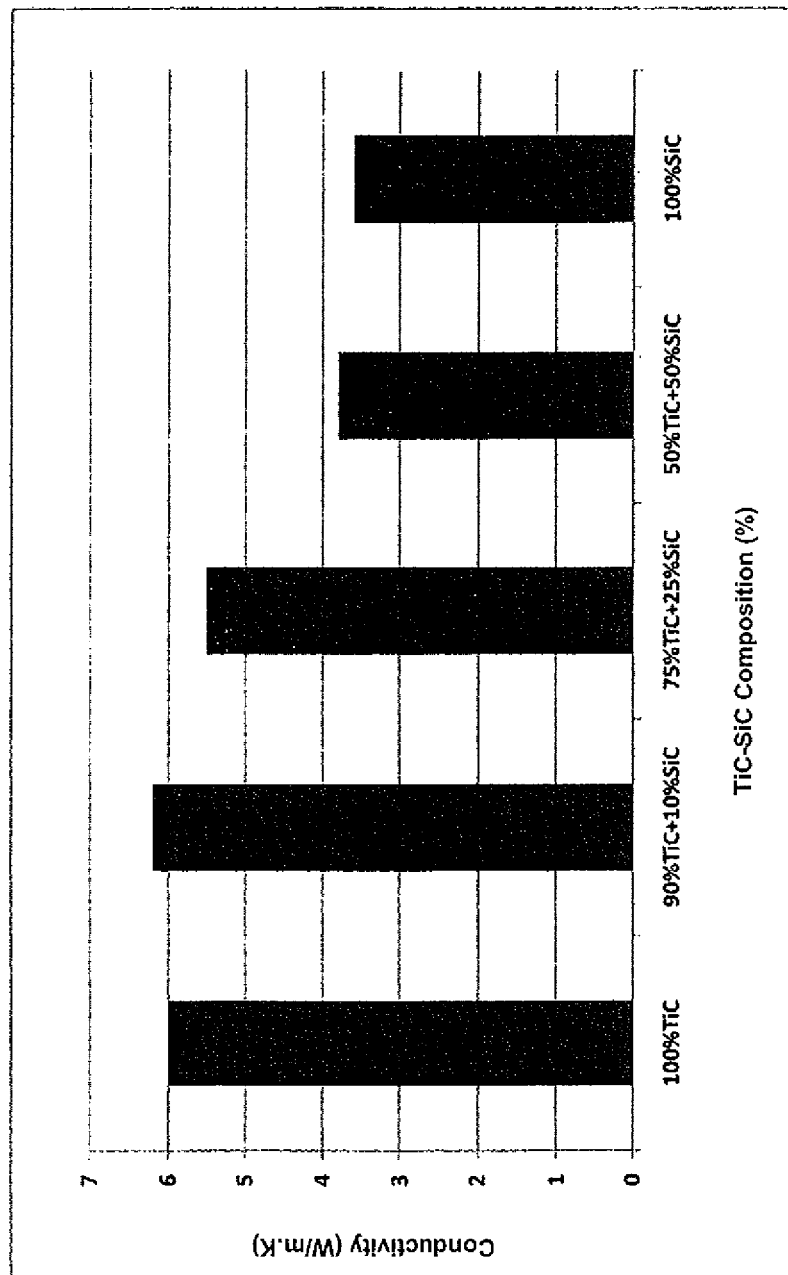
FIG. 2 shows the change, as a function of the SiC proportion, of the thermal conductivity at 800° C. of TiC-based irradiated ceramic materials.
Figure 3:
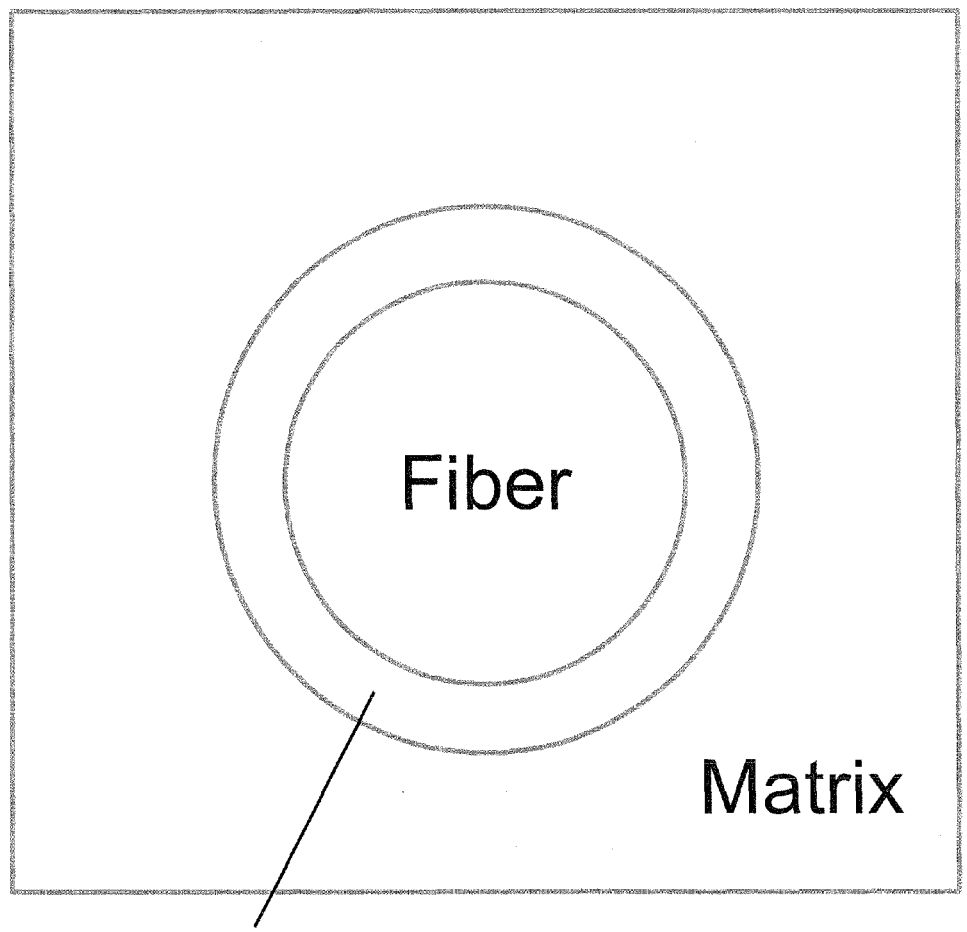
FIG. 3 is a schematic showing a small section of the nuclear fuel cladding, displaying the recited features (fibers, interphase layer, and matrix), with a single fiber seen in cross-section.

The results are summarized in FIG. 2. They show that the thermal conductivity at 800° C. of irradiated ceramic materials composed of TiC and SiC improves when the TiC proportion increases. The ceramic material which has a volume composition of 90% TiC+10% SiC (typically, a material comprising 95% to 85% TiC, with the remainder being SiC, by volume) is even found to have an optimal thermal conductivity.

Complementary results have also shown that, after irradiation by Au ions (4 MeV, 8 dpa), the thermal conductivity at 800° C. of a ceramic material made of TiC was greater than that of a ceramic material made of SiC.

It therefore appears that, to manufacture a nuclear fuel cladding, the use of a ceramic matrix composite material comprising SiC fibers, an interphase layer and a matrix comprising at least one carbide selected from titanium carbide TiC, zirconium carbide ZrC, or ternary silicon titanium carbide $Ti_3SiC_2$, allows the thermal conductivity of this cladding to be improved under irradiation at temperatures generally ranging between 800° C. and 1200° C.

During the operation of a "He-GFR" reactor, the nuclear fuel cladding of the invention may thus mechanically maintain the nuclear fuel and ensure heat transfer towards the coolant gas, more efficiently than in the case of a cladding made of a CMC of the $SiC_f$/SiC type.

What is claimed is:

1. A nuclear fuel cladding, totally or partially made of a ceramic matrix composite material comprising
   a ceramic matrix,
   silicon carbide (SiC) fibers as a reinforcement for said matrix, and
   an interphase layer provided between said matrix and said fibers,
   said matrix comprising silicon carbide (SiC) in an amount of 1-25% by volume of said matrix, and at least one carbide selected from the group consisting of titanium carbide (TiC) and ternary titanium silicon carbide ($Ti_3SiC_2$).

2. The nuclear fuel cladding according to claim 1, wherein said silicon carbide SiC represents less than 10% by volume of said matrix.

3. The nuclear fuel cladding according to claim 1, wherein said silicon carbide SiC represents between 5% and 15% by volume of said matrix.

4. The nuclear fuel cladding according to claim 1, wherein said matrix has a columnar microstructure.

5. The nuclear fuel cladding according to claim 1 wherein said fibers are totally or partially ordered.

6. The nuclear fuel cladding according to claim 1, wherein said interphase layer is totally or partially made of a compound comprising several superimposed layers.

7. The nuclear fuel cladding according to claim 1, wherein said interphase layer has a mean thickness in the range between 10 nm and 500 nm.

8. The nuclear fuel cladding according to claim 1, wherein said composite material has a porosity of 10% by volume or less.

9. A process for manufacturing a nuclear fuel cladding as defined in claim 1, which comprises the preparation of said composite material according to the following consecutive steps:
   a) making a fiber pre-form from said fibers,
   b) depositing said interphase layer by chemical vapor infiltration onto said pre-form,
   c) depositing said matrix by chemical vapor infiltration onto said pre-form coated with said interphase layer.

10. The manufacturing process according to claim 9, wherein said chemical vapor infiltration of step c) is performed using a mixture of precursors comprising i) at least one compound selected from a titanium-, zirconium- or silicon compound, ii) a hydrocarbon and iii) hydrogen.

11. The manufacturing process according to claim 10, wherein:
    said titanium compound is at least one compound selected from $TiCl_4$, $TiBr_4$ or $Ti[CH_2C(CH_3)_3]_4$,
    said zirconium compound is at least one compound selected from $ZrCl_4$, $ZrBr_4$ or $Zr[CH_2C(CH_3)_3]_4$,
    said silicon compound is at least one compound selected from $SiCl_4$, $SiH_2Cl_4$ or $CH_3SiCl_3$.

12. The manufacturing process according to claim 11, wherein said hydrocarbon is at least one compound selected from $CCl_4H_2$, $CH_4$, $C_4H_{10}$ or $C_3H_8$.

13. The manufacturing process according to claim 11, wherein at least one of said chemical vapor infiltrations of (b) and (c) is of the pulsed type.

14. The manufacturing process according to claim 10, wherein said hydrocarbon is at least one compound selected from $CCl_4H_2$, $CH_4$, $C_4H_{10}$ or $C_3H_8$.

15. The manufacturing process according to claim 14, wherein at least one of said chemical vapor infiltrations of (b) and (c) is of the pulsed type.

16. The manufacturing process according to claim 9, wherein at least one of said chemical vapor infiltrations of (b) and (c) is of the pulsed type.

17. The manufacturing process according to claim 10, wherein at least one of said chemical vapor infiltrations of (b) and (c) is of the pulsed type.

18. The nuclear fuel cladding of claim 1, wherein the thermal conductivity of the matrix when irradiated with nuclear radiation and at temperatures between 800° C. and 1200° C. is higher than that of a pure SiC matrix under the same conditions.

19. The nuclear fuel cladding of claim 18, wherein the temperature is 800° C.

20. The nuclear fuel cladding of claim 19, wherein the source of the nuclear radiation are Kr ions having an energy of 74 MeV, and implanted in said matrix so as to provide an irradiation dose of 1 displacement per atom.

* * * * *